United States Patent [19]
Costas

[11] Patent Number: 5,019,929
[45] Date of Patent: May 28, 1991

[54] MAGNETIC MEDIA DUPLICATION SYSTEM

[75] Inventor: Dan N. Costas, Fremont, Calif.

[73] Assignee: Trace, Inc., San Jose, Calif.

[21] Appl. No.: 239,444

[22] Filed: Sep. 1, 1988

[51] Int. Cl.$^5$ .......................... G11B 5/86; G11B 5/016
[52] U.S. Cl. ..................................... 360/98.01; 360/15; 360/99.03
[58] Field of Search ............. 360/92, 98.1, 99.02, 360/99.03, 99.12, 137, 15

[56] References Cited

U.S. PATENT DOCUMENTS

| | | | |
|---|---|---|---|
| 3,931,640 | 1/1976 | Takahari et al. | 360/99.02 X |
| 4,170,031 | 10/1979 | Beuch et al. | 360/98.06 X |
| 4,195,321 | 3/1980 | Chelin et al. | 360/99.03 X |
| 4,510,542 | 4/1985 | Aggeler | 360/99.12 |
| 4,661,870 | 4/1987 | Norton et al. | 360/99.03 |
| 4,665,455 | 5/1987 | Mesher | 360/99.03 |
| 4,688,124 | 8/1987 | Scribner | 360/99.03 X |
| 4,747,005 | 5/1988 | Seki | 360/137 X |
| 4,807,066 | 2/1989 | Imazaike | 360/92 |

*Primary Examiner*—John H. Wolff
*Attorney, Agent, or Firm*—Harrison & Eakin

[57] ABSTRACT

A device for duplicating magnetic disks and the like includes an inlet bin for holding magnetic disks, a motorized picker for selecting a disk from the bin along a substantially straight line pathm, a pressure roller for receiving the disk as it exits the bin and positioning the disk in a processing device, and a leaf spring for redirecting the path of the disk as it exits the processing device.

4 Claims, 15 Drawing Sheets

MAGNETIC MEDIA DUPLICATION SYSTEM

FIELD OF THE INVENTION

The present invention relates to systems for automatic duplication of magnetic media, and more particularly relates to systems for automatic duplication of floppy disks and the like, occasionally referred to as autoloaders.

BACKGROUND OF THE INVENTION

With the advent of the personal computer, an entire industry of mass marketed software has developed. Most such software is provided on magnetic media such as flexible disks, or diskettes, generally referred to as floppy disks or floppies. Floppy disks come in a variety of types, including eight inch format (now nearly obsolete), 5¼ inch format, and 3½" format. In each of these formats, the round disk is maintained in a substantially square jacket. Although the jacket is somewhat larger than the disk, the width of the jacket of the disk will be referred to herein as the width of the disk.

Regardless of the format, the software industry requires systems able to quickly, easily and reliably replicate the software of interest from a master disk to at least one target disk. High reliability is of particular importance because jams or other failures lead to the need for human intervention, thereby significantly, and unacceptably, increasing the cost of operation.

Various types of machines for accomplishing this result have existed in the past, including the Trace (formerly Formaster Magnetic Designs) Stargate and Intelligent Autoloaders IL3 and IL5, the Mountain 3235, 3250 and 3280 autoloaders as well as the Mountain Desktop Diskcopiers in 3.5" and 5.25" format, the Action Copy Box, models 350 and 525, the Ashby models 312, 512, 322 and 325, the IXI Standalone Duplicators, the Ventuno 3 and 5 autoloaders, the MST Replica, models P300, 500 and 800, the Replimate Copier series, and the Victory V 3000 and V 7000 series autoloaders.

Each of these machines was basically designed to hold one or more bulk diskettes in an inlet hopper of some sort, to move one bulk diskette at a time out of the hopper into a duplicating drive (when the disk becomes the target disk), to duplicate the software from the master disk to the target disk, to eject the target disk, and to repeat the process with the next bulk disk. If the duplication is successful, the target disk is typically placed in an accept bin, and if the duplication was unsuccessful, the target disk is typically placed in a reject bin. Bins of various types have typically been provided for the output locations. The master disk or other master copy of the software is typically resident on a personal computer or other similar controller which is external to but controls the operation of the disk drive in the autoloader. An internal controller typically controls the motors within the autoloader.

To a greater or lesser extent, each of these machines has limitations concerning the number of bulk disks which could be held in the hopper awaiting duplication, the speed at which the target disk could be moved reliably through the feed and exit paths, and the ability to remove disks from the output bins without stopping operation of the autoloader. The number of disks which could be reliably held in the inlet hopper has been a significant problem. In most prior art designs, the input hopper has simply been a vertical bin, with the bulk disks stacked one atop the next. This creates excessive forces on the bottom disk in the hopper, which is typically the next disk to be processed. The excessive forces on the bottom disk can result in the disk becoming misaligned, or in having two disks fed into the path, or in not having any disk fed into the path. Each of these failures can result in a jam requiring human intervention.

The speed at which disks could be processed through the feed and exit paths has also presented problems. The number of disks which can be processed in a given time is directly related to the speed at which the disk can be fed through these paths, so increased speeds are obviously desirable. However, in the prior art increased speeds frequently have resulted in jams.

Finally, removal of processed disks has in the past presented some difficulties. In mass duplication operations, it is preferable to be able to remove the processed disks (whether successfully duplicated or rejected) from the autoloader without stopping processing. In a number of the prior art autoloaders, this has not been possible, and removal of the disks has required shutting down the loader, removing one or more bins, emptying them, replacing the bins, and restarting the system. Again, the labor involved has resulted in increased costs.

There has therefore been a need for a fast, reliable autoloader capable of duplicating software on a large quantity of flexible disks without stopping.

SUMMARY OF THE INVENTION

The present invention substantially minimizes or resolves each of the foregoing limitations of the prior art by means of an inlet bin capable of stacking large quantities of bulk disks, a high speed feed and exit path, and an output bin which permits access to processed disks without affecting disk processing.

The inlet bin or hopper is maintained at a significant angle and also includes a restriction, which together substantially reduce the weight applied to the bottom disks in the stack. The inlet bin cooperates with a crank driven picker which selectively pushes the bottom disk from the inlet bin into the feed path, where rollers advance the disk into the duplication drive.

After the disk is processed in the duplication drive, it is ejected from the drive and propelled into the output bins through additional rollers. The disk is guided along the proper path by means of a plate leaf spring which prevents the disk from passing back into the inlet hopper. Depending upon whether the disk was successfully processed or not, the disk is deposited in either the accept bin or the reject bin. Because of the relative straight line paths of the disk going into the duplication drive and coming out of the drive, high processing speed may be reliably maintained by the system.

The accept bin, which need not be included in many embodiments, is shaped similarly to the inlet hopper, and further includes a pair of inward protruding hinge plates. When the processed disk is passed into the accept bin, it arrives at the bottom of the bin. A stack plate is then actuated, and lifts the disk upward past the hinge plates. The disk is prevented from falling back down by the inward protruding hinge plates, so that the lifting plate may be lowered in time for the next processed disk to arrive.

Since most disks are successfully processed, and therefore passed into the accept bin, no similar arrangement is usually necessary for the reject bin. However, such an arrangement could be provided within the scope of the present invention.

In another embodiment, the accept bin and reject bin can be reversed. In this embodiment, the accept (formerly reject) bin of the autoloader of the present invention may be stacked above the inlet bin of another machine, such as a verifier, certifier, labeler, printer, etc., and the bottom of the newly configured accept bin can be removed. In this way, processed disks can be fed directly into the inlet hopper of the next lower machine.

It is therefor an object of the present invention to provide an inlet means which substantially supports a plurality of flexible disks stacked for future processing.

It is another object of the present invention to provide an improved method and apparatus for duplicating software on magnetic media disks.

It is yet another object of the present invention to provide an improved apparatus for selecting a single disk for processing from the bottom of a stack of disks.

It is still another object of the present invention to provide an improved apparatus for redirecting the path of a processed disk toward an output bin.

It is a further object of the present invention to provide an autoloader in which the feed and exit paths each are essentially straight line movements.

These and other objects of the present invention will be better appreciated from the following Detailed Description of the Invention, taken in conjunction with the appended

FIGURES in which

FIG. 1 provides a right side elevational view of the autoloader of the present invention;

FIG. 2a provides a top plan view of the autoloader of the present invention with the inlet hopper removed;

FIG. 2b shows a left side section view of the autoloader of the present invention taken along the section line A—A shown in FIG. 2a;

Figure 2A:
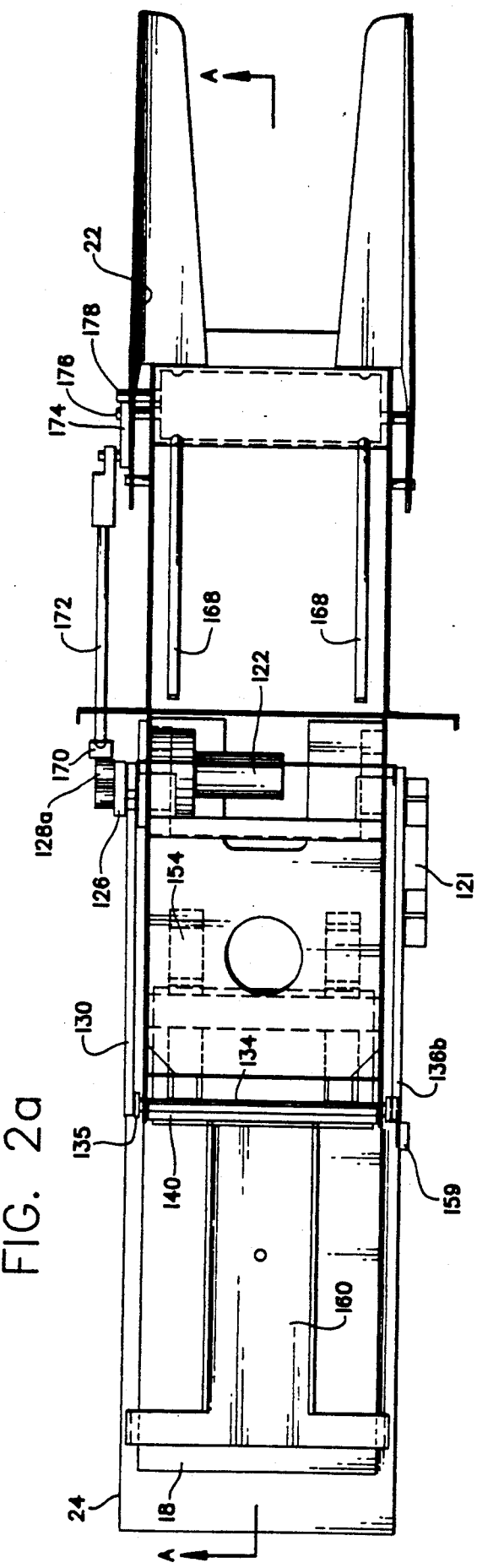
Figure 3A:
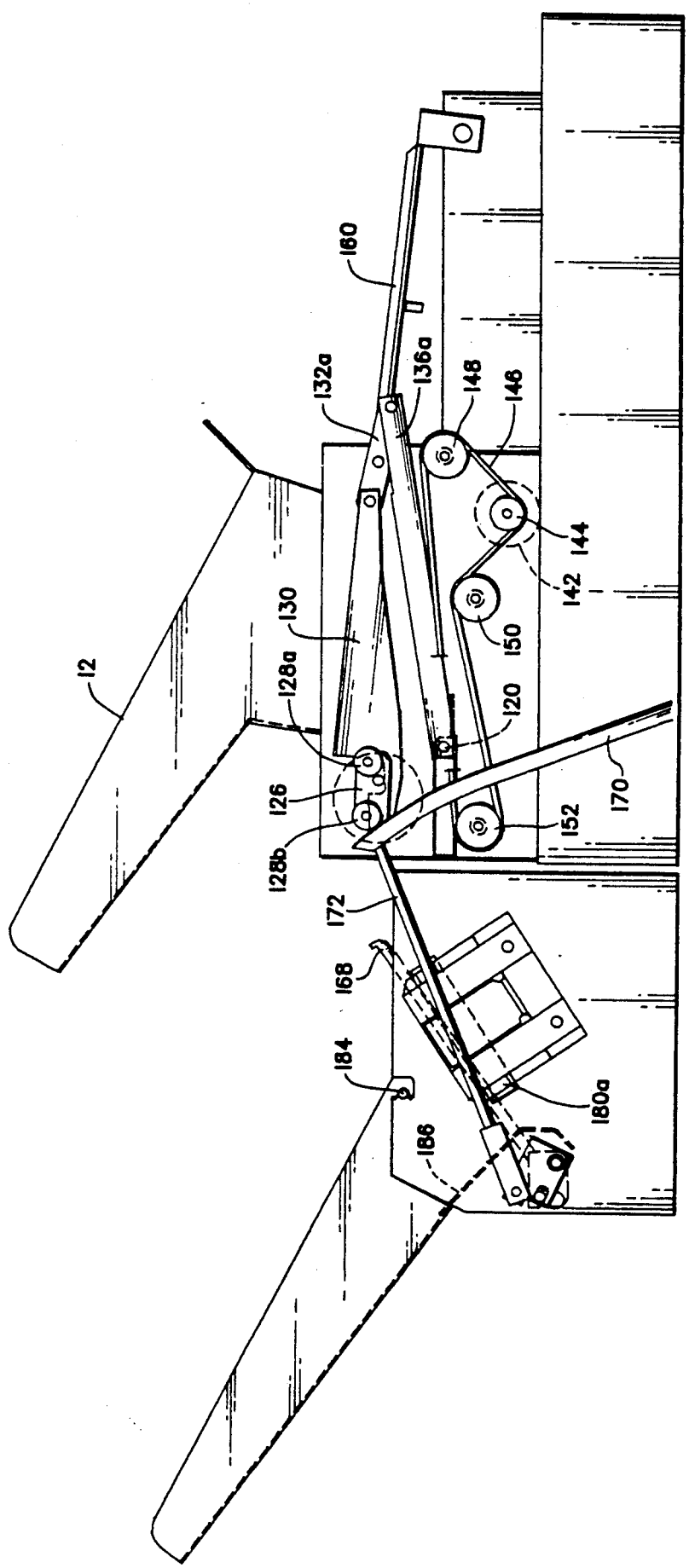
Figure 3B:
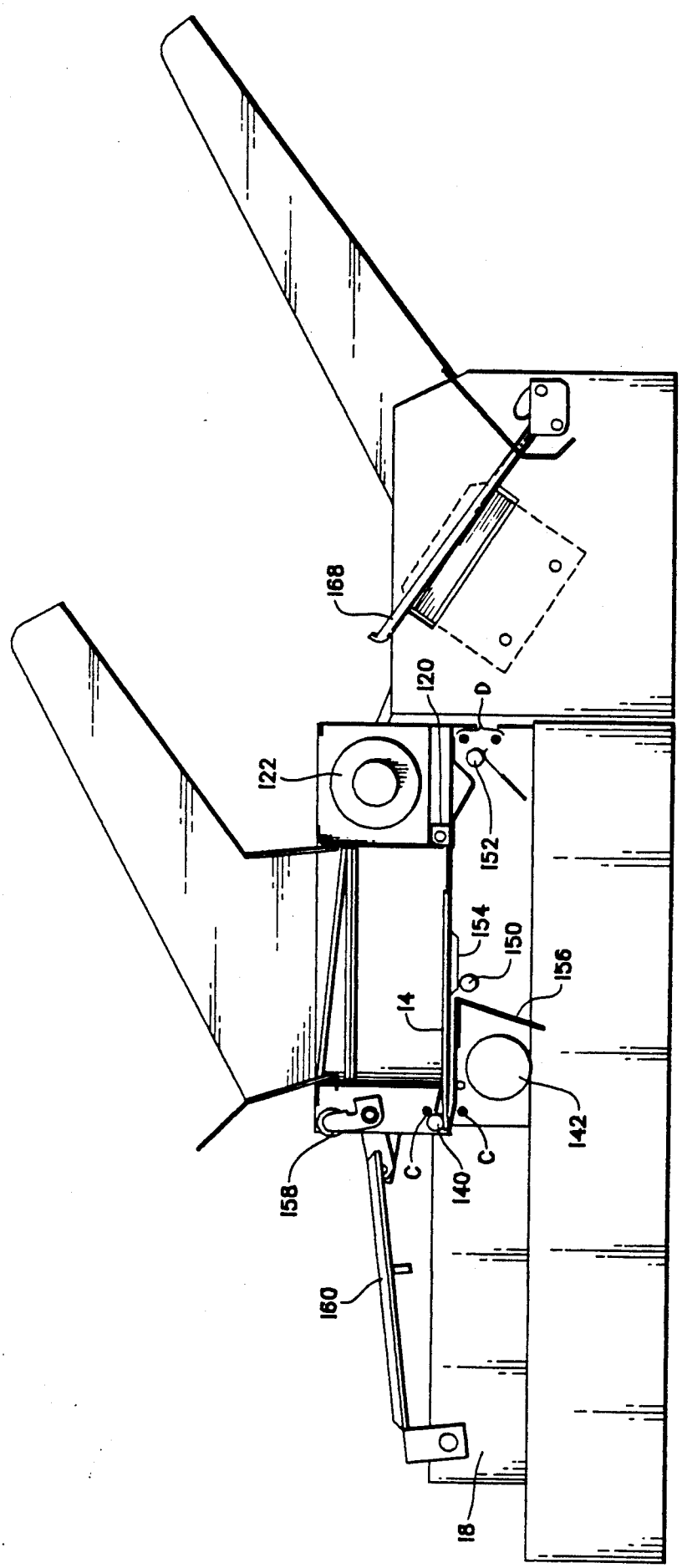
Figure 3C:
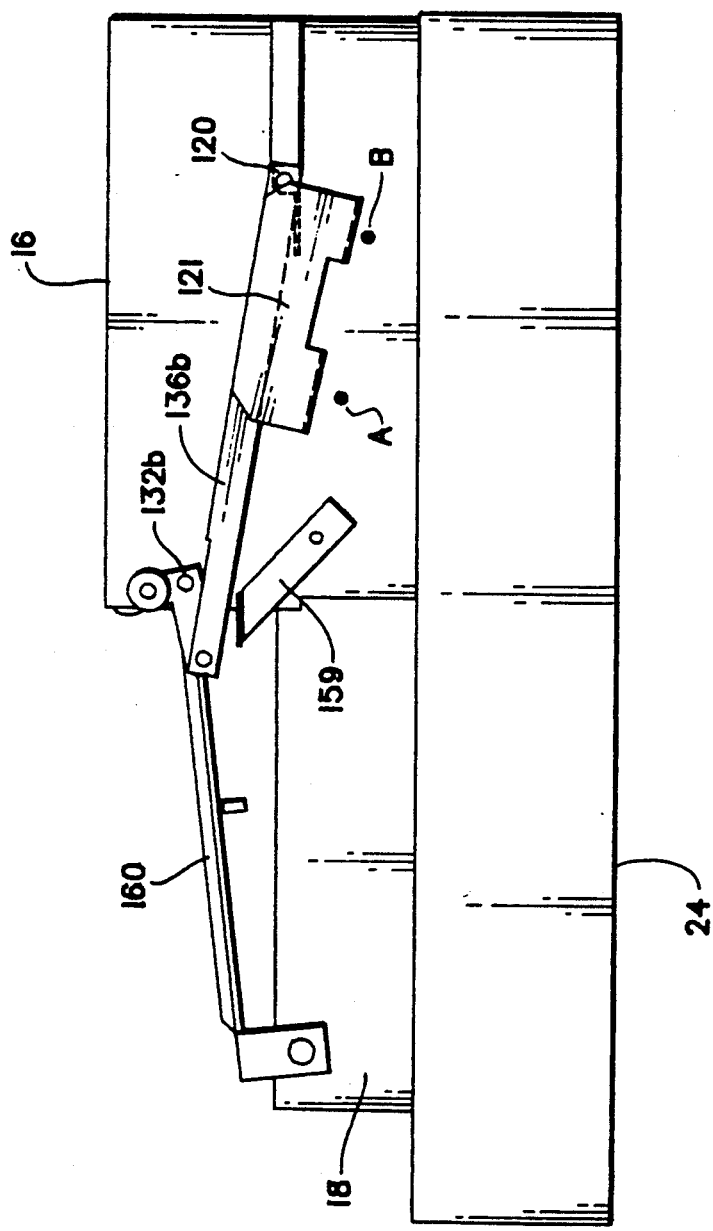
Figure 4A:
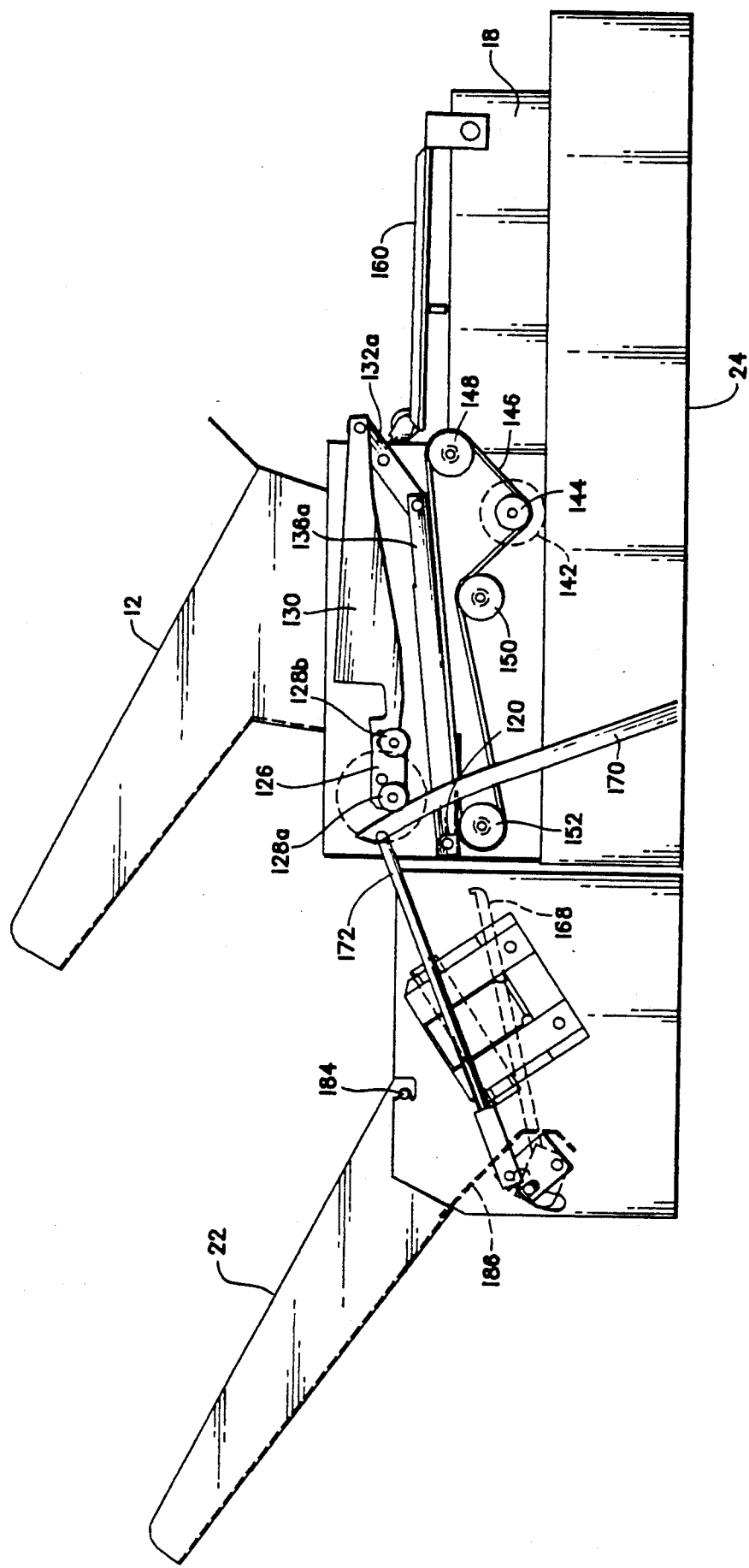
Figure 4B:
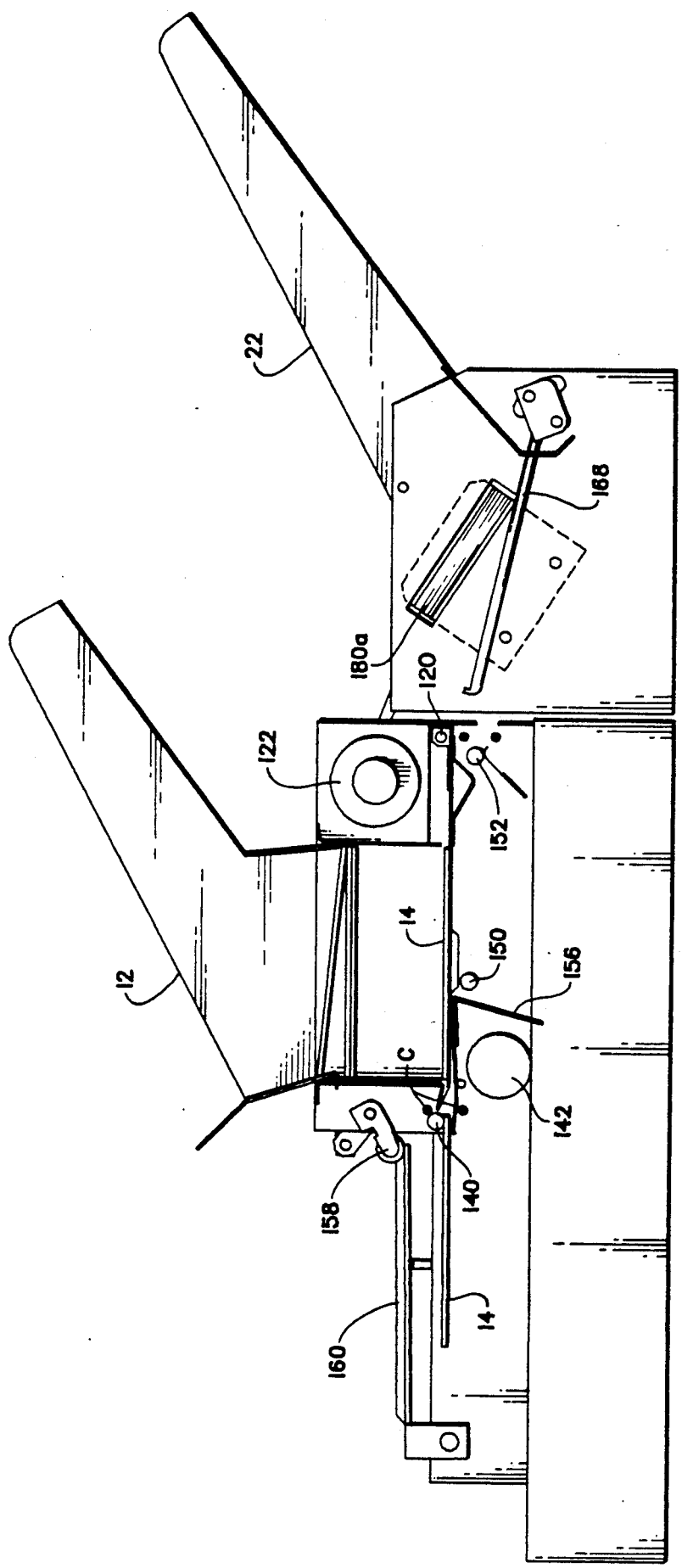
Figure 5:
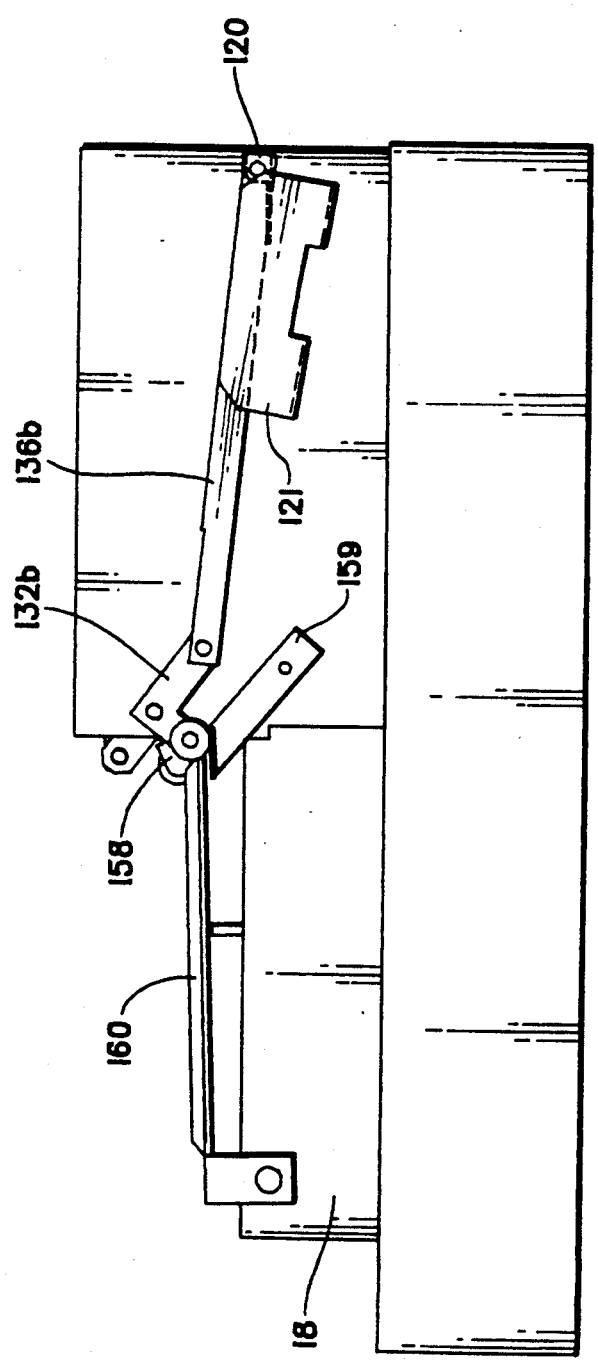
Figure 6:
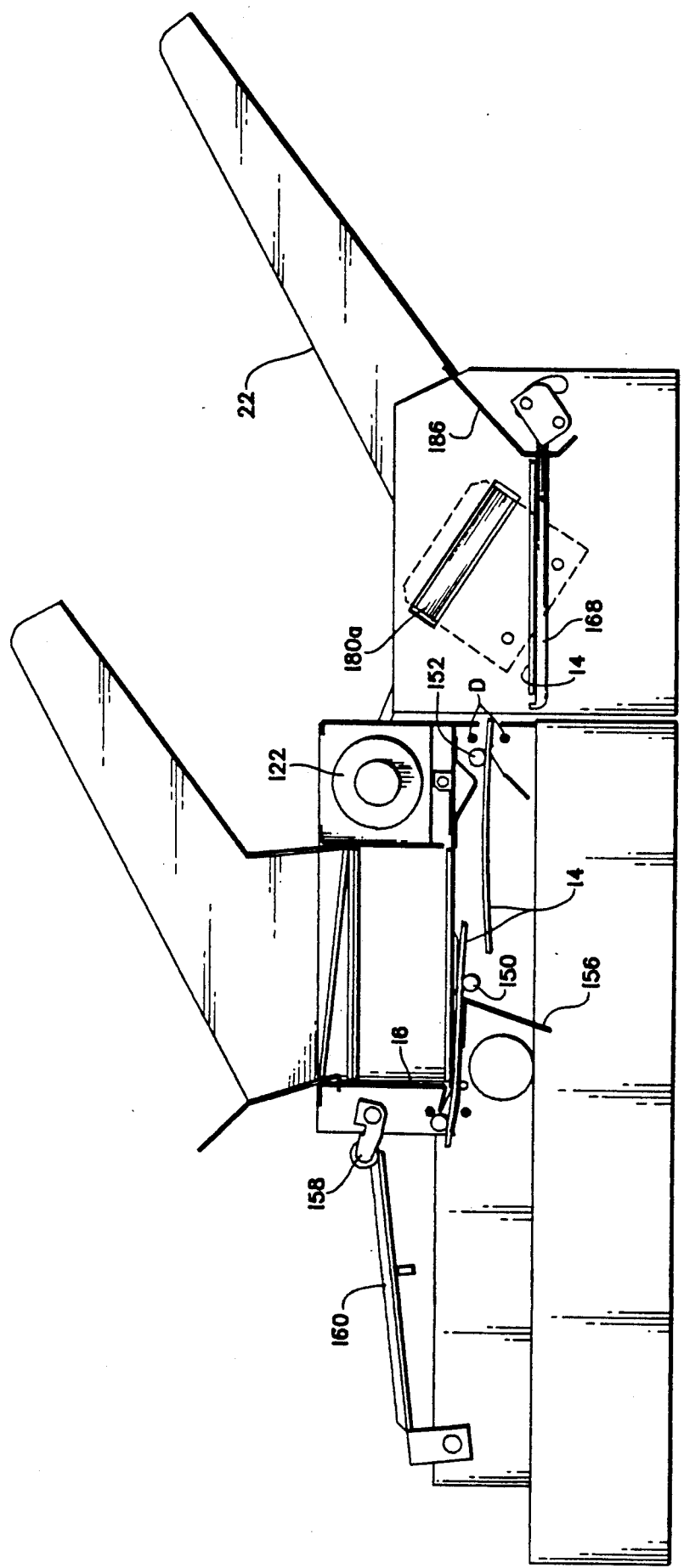
Figure 8A:
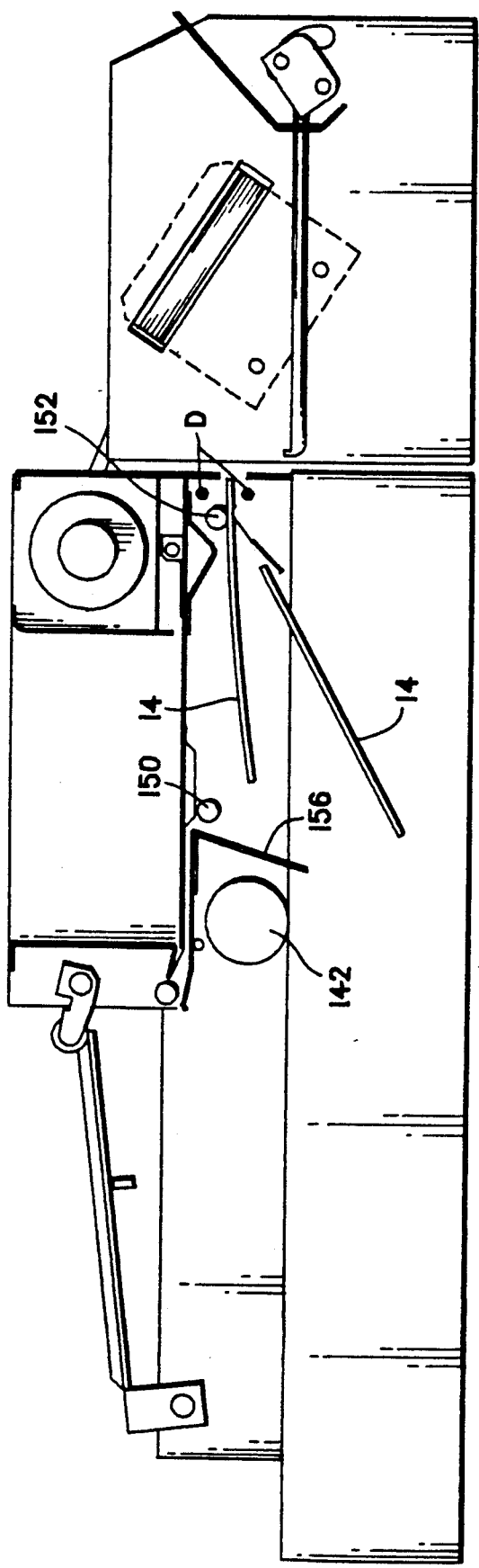
Figure 8B:
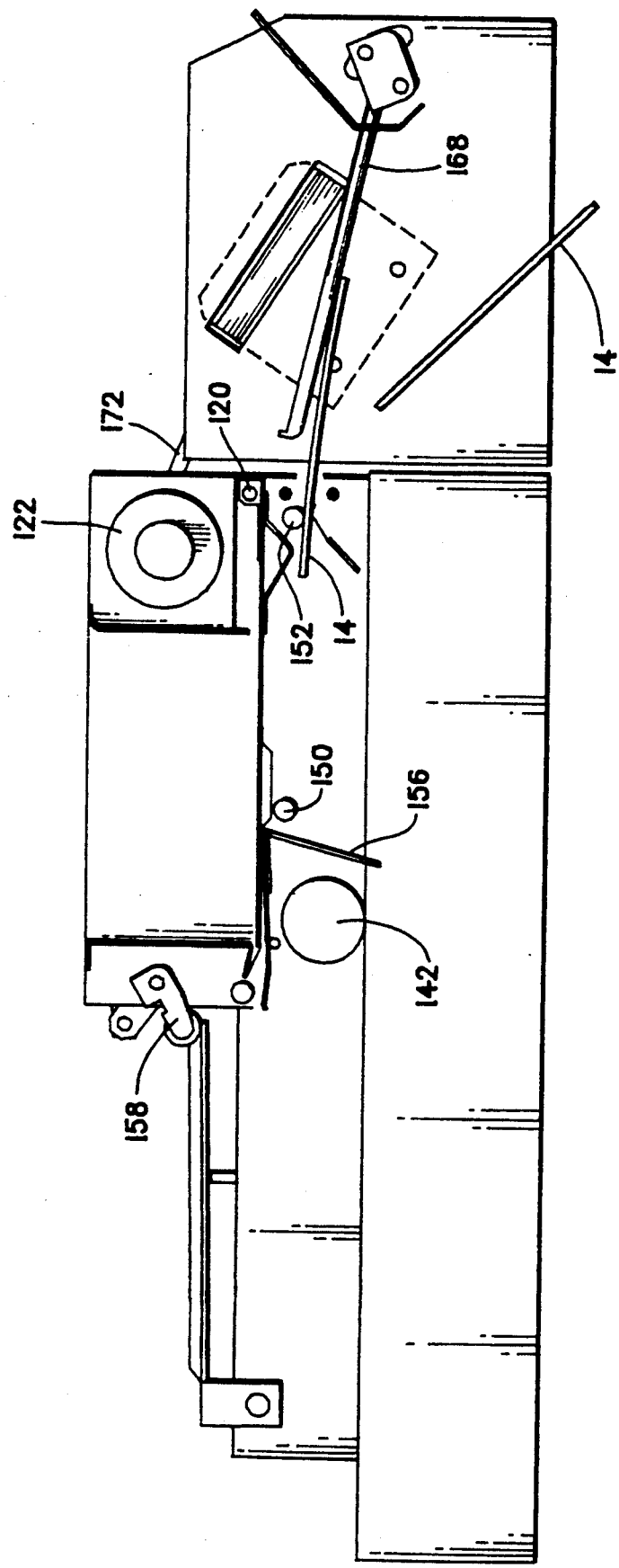
Figure 9:
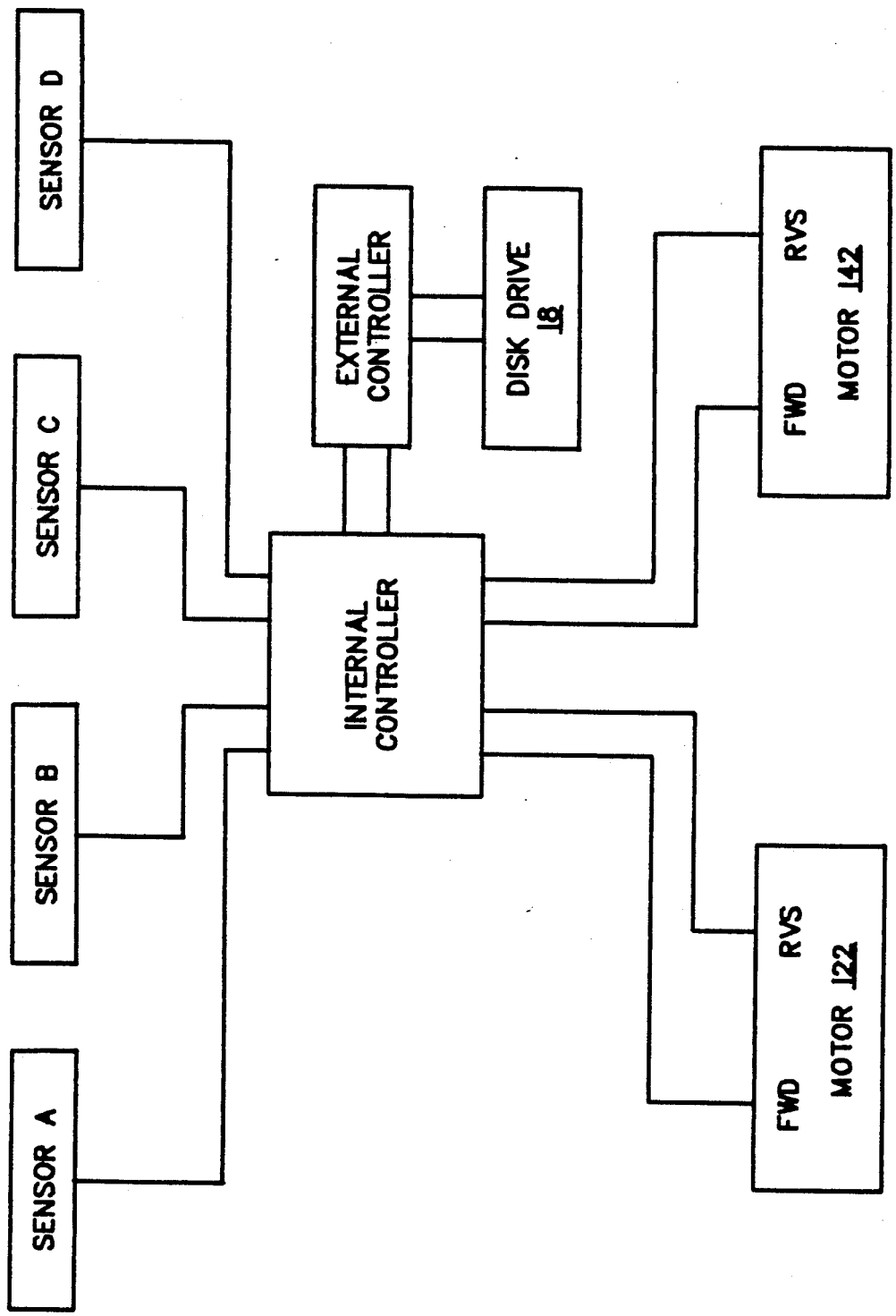

FIG. 3a provides a right elevational side view of the loader of the present invention during the "pick" operation;

FIG. 3b provides a left side section view of the loader during the "pick" operation taken along the line A—A in FIG. 2a;

FIG. 3c provides a left side elevational view of the drive mechanism of the present invention during the "pick" operation;

FIG. 4a provides a right elevational side view of the autoloader of the present invention in the "clamp" position;

FIG. 4b provides a left side section view taken along the line A—A of FIG. 2a when the autoloader is in the "clamp" position;

FIG. 5 is a left side view drive mechanism of the present invention in the "clamp" position, with the inlet hopper and exit bin removed;

FIG. 6 is a left side section view during ejection of the disk from the drive, taken along the line A—A in FIG. 2a;

FIGS. 7a–d show the operation of the stacker in the exit bin of the present invention;

FIG. 8a is a left side section view taken along the section line A—A in FIG. 2a and showing one reject mode;

FIG. 8b is a left side section view taken along the section line A—A in FIG. 2a and showing a second reject mode; and FIG. 9 shows in schematic block diagram form the control circuitry of the present invention.

DETAILED DESCRIPTION OF THE INVENTION

Figure 1:
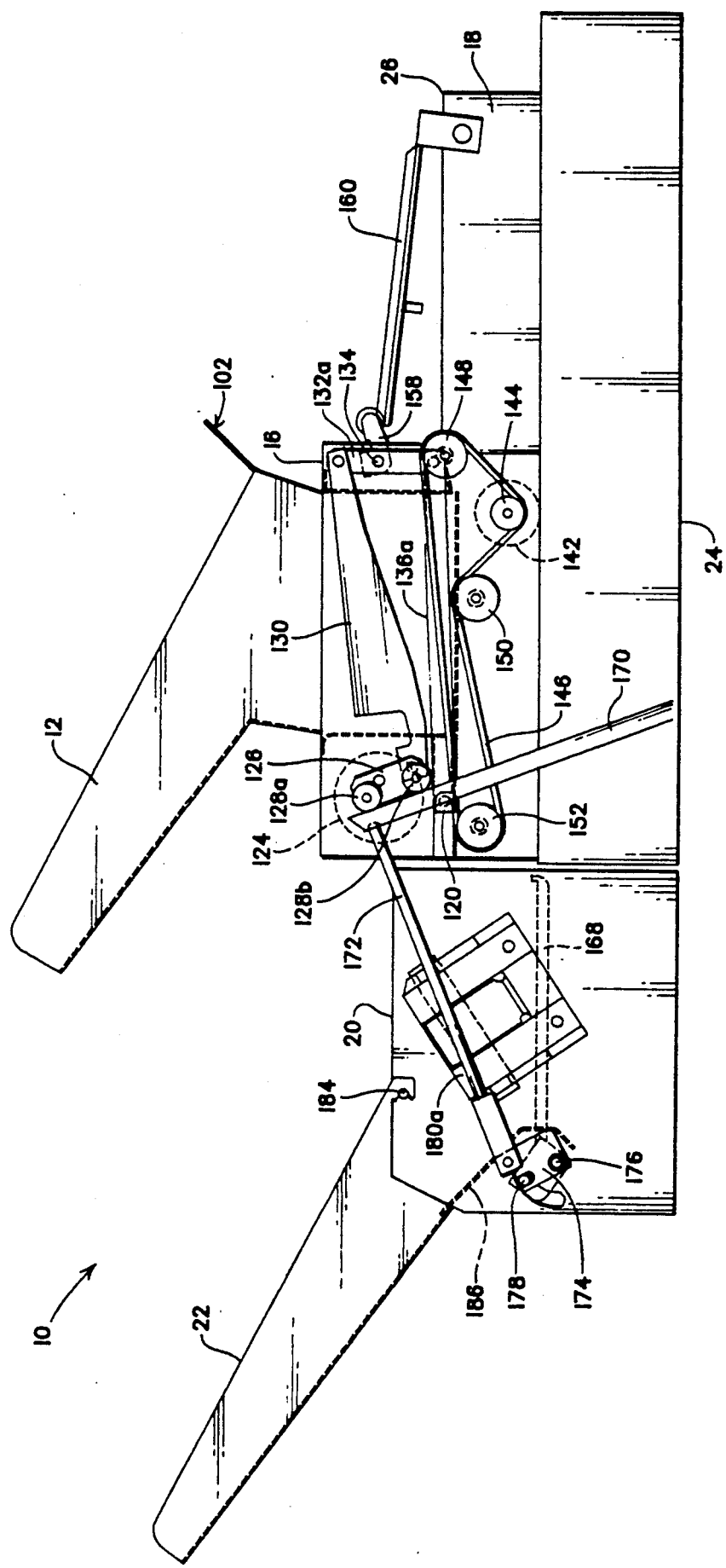

Referring first to FIG. 1, the autoloader 10 of the present invention may be better appreciated. To facilitate greater understanding of the invention, the exterior skins or covers of the autoloader 10 have been removed in each of the figures.

The autoloader 10 shown in FIG. 1 includes an inlet hopper 12 which supplies magnetic media such as a floppy disk 14 to a holding bin 16. Through mechanisms explained in greater detail hereinafter, the bottom disk 14 in the holding bin 16 is selected from the inlet hopper and positioned in a conventional floppy disk drive or other appropriate drive 18. The autoloader, which typically interfaces with an external controller such as a personal computer or other similar device (see FIG. 9) in a conventional manner, causes the drive to write data to the disk, typically for the purpose of duplicating a master program resident in the external controller.

Following the successful duplication of the master program on the disk 14 in the drive 16, the disk 14 is ejected from the drive 18 and transported to an outlet bin 20, which includes an outlet hopper 22 similar in construction to the inlet hopper 12. The drive mechanism of the present invention, and the disk drive 18, may also be seen to be supported on a lower housing 24, and the disk drive 18 is typically maintained within a housing 26. The operation of each of these elements, as well as others, will now be described in greater detail.

Figure 2C:
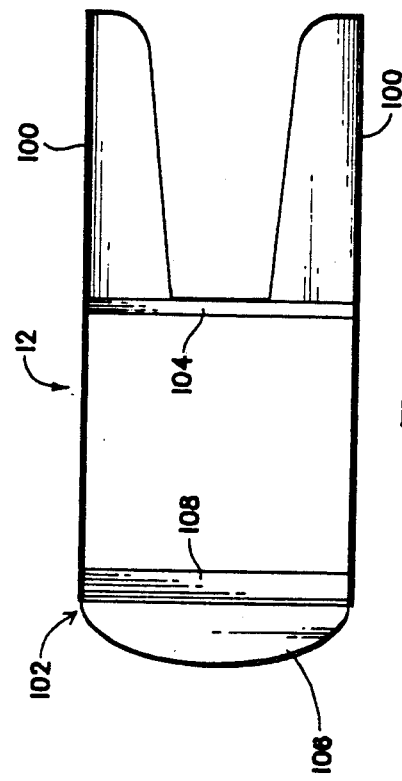
FIG. 2c shows a top plan view of the inlet hopper.
Figure 2B:
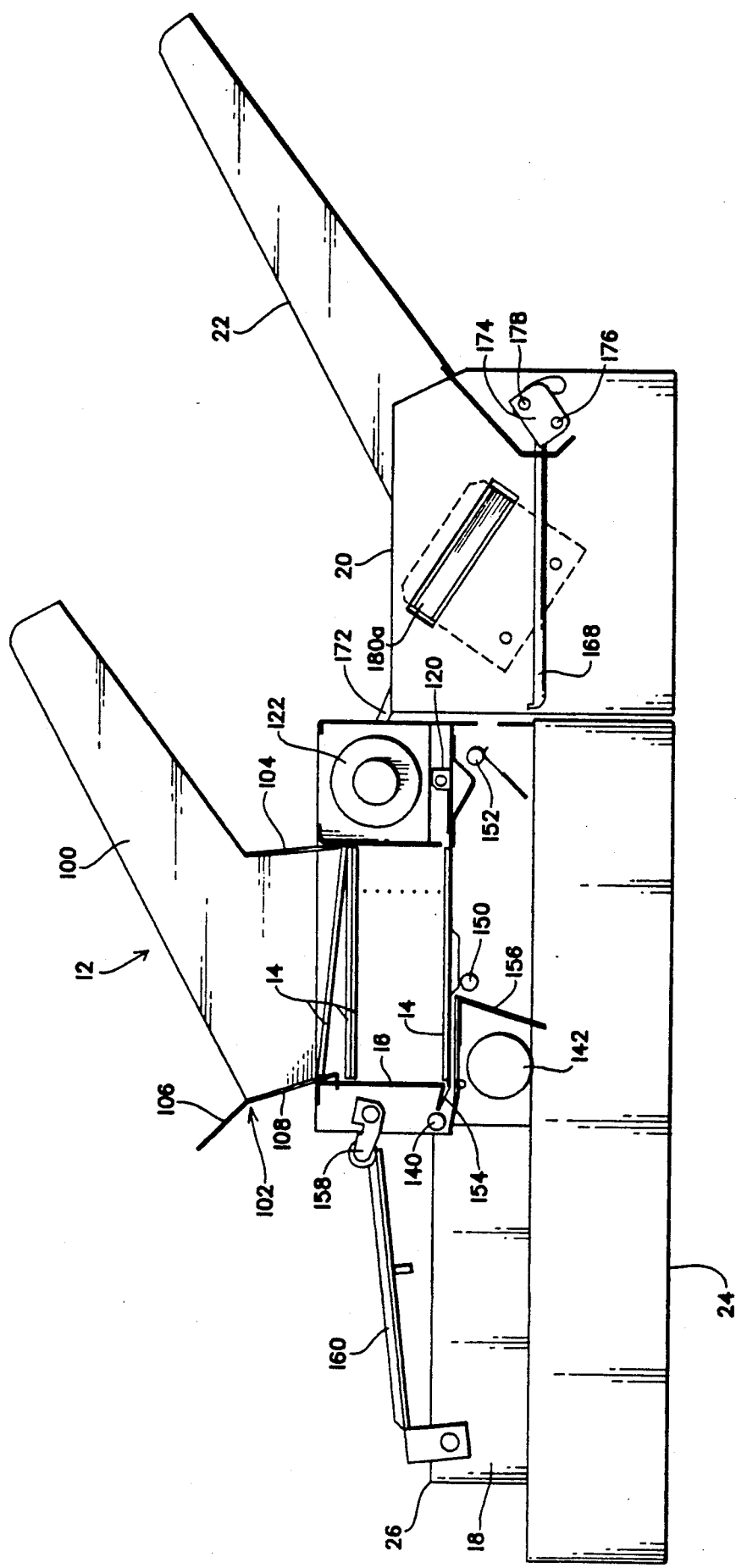

Referring next to FIGS. 2a–2c, taken in conjunction with FIG. 1, the inlet hopper 12 can be seen to comprise a pair of sides 100 fixed to a front member 102 and a rear member 104. The front member 102 can be seen from FIG. 2b to comprise an upper portion 106 and a lower portion 108. The upper portion 106 can be seen to be above the junction of the sides 100 with the front member 102, while the lower portion 108 of the front member 102 extends from the junction with the sides 100 to the bottom of the inlet hopper 12. Although not necessary in all cases, it will be appreciated that the upper portion 106, which serves simply to ensure that incoming disks are retained in the hopper, is angled at a slightly greater angle relative to the vertical than the lower portion 108, although no specific angle is required.

The sides 100 can be seen from FIGS. 1 and 2b to extend upwardly and to the back relative to the rear member 104 at a nominal angle on the order of 45 degrees from the vertical, and are further bent to form a base (see FIG. 2c) over the length of the slanted portion such that incoming disks may be deposited therein without causing an undue force on the bottom disk in the stack. This pressure relief provides a substantial assist in smoothly selecting the bottom disk in the stack for processing, as will be more thoroughly described hereinafter. It will be appreciated that while a nominal angle on the order of 45 degrees has been shown, other angles within a relatively broad range are acceptable so long as the angle is sufficient to permit the disk to slide down the inlet hopper while not creating such force on the bottom disk in the holding bin 16 that it cannot be selected smoothly In some embodiments it may be desirable to slant the sides 100 slightly inward from top to bottom.

It can further be seen that the hopper 12 is typically filled with a substantial number of disks 14, such as 5¼ inch or 3½ inch floppy disks. As the disks slide down the inlet hopper, they reach a transition point where the slant portion of the sides 100 meet the front member 102 and rear member 104. At this point the distance between top of lower portion 108 of the front member 102 and the top of the rear member 104 becomes significant, and slightly exceeds the width of the disk being processed. The incoming disks 14, then, readily transition from the rearward-slanted portion of the inlet hopper 12 into the more vertical lower portion.

However, to assist in preventing excessive force on the lowest disk in the vertical portion of the inlet hopper 12, the lower portion 108 of the front member 102 slants toward the rear of autoloader 10 at a greater angle than the rear member 104 (best seen in FIG. 2b), such that the distance between the bottom of the front member 102 and the rear member 104 is slightly less than the width of a disk. This causes the front edge of the disk 14 to rise and to be supported by the inlet hopper itself, while the rear edge continues to rest on top of the lower disks in the stack.

As more disks are processed, the rear edge of the disk 14 moves downward. The front edge of that disk also moves downward, but along the inside surface of the member 108. Eventually, the rear edge of the disk 14 will be enough lower than the front edge that the distance is sufficient to allow the front edge of the disk to clear the bottom of the member 108. At this point the disk falls on top of the other disks in the holding bin 16. The holding bin 16 simply comprises four substantially vertical walls 112, as shown in FIG. 2b, with the front wall (the wall nearest the disk drive 18) having a gap at the bottom thereof sufficient to permit a single disk 14 to slide thereunder.

It will be appreciated that the inlet hopper 12 and holding bin 16 may be mutually sized so that the number or disks held therein is small enough that no excessive forces on placed on the bottom disk in the holding bin. In this manner the inlet hopper 12 and holding bin 16 cooperate to permit relatively continuous processing of large quantities of disks, including permitting disks to be added to the inlet hopper even as the autoloader is operating.

Figure 2D:
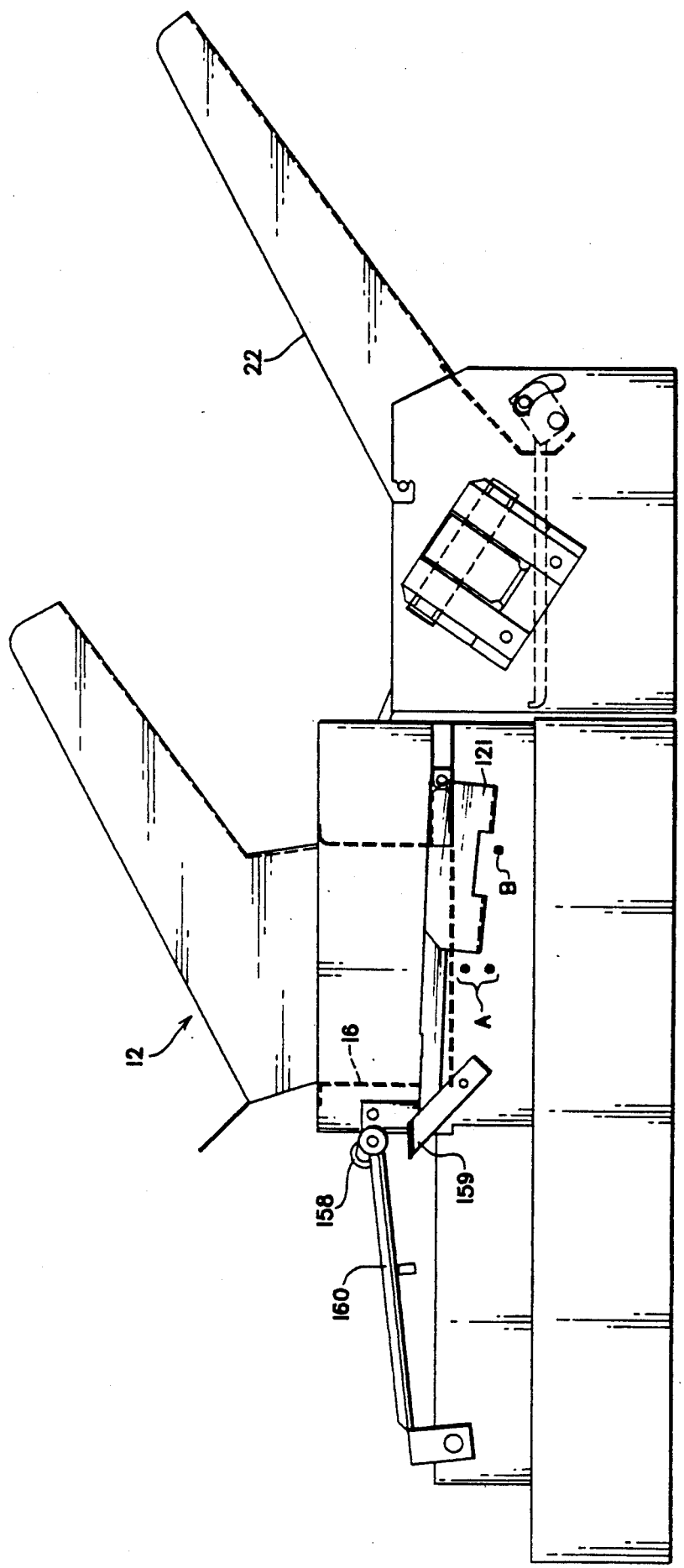
FIG. 2d shows a left side elevational view of the autoloader of the present invention.

When the disk 14 reaches the bottom of the holding bin 16, it becomes the next disk available for processing. At the beginning of the processing cycle for that disk, the disk 14 rests at the bottom of the holding bin 16, and a picker 120 is in a quiescent state to the right of the disk. As will be appreciated from the discussion to follow, this beginning state is mechanically neutral, in that the system will attempt to remain in or return to this position even if slight forces are applied in either direction. The internal controller (FIG. 9) is able to determine that the picker 120 and related drive mechanism, explained below, is in the neutral position by virtue of sensors A and B, shown in FIG. 2d, which may be each be an LED-phototransistor pair. A mask 121 is configured on the left side of the autoloader 10 such that at the neutral position, both sensors are light (i.e., light from the LED reaches the respective phototransistor).

To begin the cycle, the picker 120 is driven toward the disk 14 and moves the disk along the bottom of the holding bin toward disk drive 18, as shown in FIGS. 3a-3c. The picker is actuated by a reversing motor 122 which, as also seen in FIG. 1, operates through a crank 124 to drive a pivot arm 126. The signals from the sensors A and B are used by the internal controller to determine the position of the drive mechanism, and therefore when to start and stop the motor 122.

As will be discussed in greater detail hereinafter, the pivot arm 126 supports upper and lower rollers 128a-b, which are preferably made of nylon or other suitable low friction material. In addition, the pivot arm 126 is connected at its lower end to a drive arm 130, which extends forward to the upper end of a right-side picker pivot arm 132a. The picker pivot arm 132a is fixedly mounted to a rotating shaft 134 (better seen in FIG. 2a) which extends across the width of the autoloader 10 at the front of the holding bin 16 and connects to a left-side picker pivot arm 132b (shown in FIG. 3c). Bushings 135 may be provided to ensure smooth rotation of the shaft 134. The shaft 134 connects to the picker pivot arm at a location slightly higher than the midpoint of the pivot arms 132a-b.

The lower end of the picker pivot arms 132a-b are connected to a pair of picker drive arms 136a-b, respectively, which in turn connect to the picker 120 on the left and right side. The picker 120 is thus pulled forward from both sides through the bottom of the holding bin 16 by virtue of the rotation of the motor 122 in a first direction, causing the bottom disk 14 in the holding bin 16 to be pulled forward toward the disk drive 18. The positions of the pivot arm 126, drive arm 130, picker pivot arms 132a-b, and picker drive arms 136a-b at the end of the "pick" operation can be better appreciated from FIG. 3a. In addition, the position of the mask 121 relative to the sensors A and B can be seen from FIG. 3c, and it can be seen that both sensors are now dark. It will also be appreciated that, in passing from the middle to the pick position, the left sensor A was dark while the right sensor B was light.

Referring particularly to FIG. 3b, as the disk 14 moves forward, it comes into contact with a pressure roller 140. The pressure roller 140 is driven through a pulley and belt arrangement by a reversing motor 142, shown in FIGS. 1, 2b and 3b. More specifically, the motor 142 is connected to a pulley 144 (FIGS. 1, 3a) and drives a belt 146. The belt drives a pulley 148 connected to the pressure roller 140 as well as a pulley and second pressure roller combination 150 and a pulley and third pressure roller combination 152, discussed in greater detail hereinafter.

When the disk 14 moves forward out of the holding bin 16, it passes under the lower lip of the front member 102 of the holding bin 16, best seen from FIG. 3b. As the disk passes under the lower lip, it also passes over a light tension leaf spring 154, and breaks the light on a sensor C, again an LED-phototransistor pair, so that the phototransistor goes dark. After the leading edge of the disk 14 passes over the leaf spring 154, it passes between the pressure roller 140 and a spring-tensioned rocker plate 156. The pressure roller 140 is caused by the motor 142 to rotate and drive the disk 14 forward into the disk drive 18. When the disk 14 is fully loaded in the drive 18, the back edge of the disk extends past the sensor C, so that the sensor transitions back from dark to light. In this manner, the internal controller knows that the disk has been loaded into the disk drive, and can stop the lower motor. As can be seen from FIG. 4b, the pressure roller 140 remains in contact with the back edge of the disk 14 when the disk is fully inserted into the drive 18. As can be appreciated from the foregoing, the feed path for the present invention is substantially a straight line, substantially reducing risks of jamming. 1 Simultaneously with the disk 14 being loaded into the drive 18 through the rotation of the motor 142, the motor 122 reverses direction, causing the drive arm 130 to be driven fully forward, as best seen in FIG. 4a. This causes the picker 120 to be driven back, but also causes the shaft 134 to rotate clockwise when viewed from the right side. Fixedly attached to the midpoint of the shaft 134 is a clamp roller 158, shown in FIG. 4b, which rotates downward when the shaft 134 rotates clockwise. A rocker plate release 159, fixedly attached to the pivot point of the rocker plate 156, is also driven downward by a roller on the left pivot arm 132b.

The clamp roller 158 engages a closure plate 160, which is pivotably attached to the far end of the disk drive housing 26, best seen from FIG. 4b. This causes the disk 14 to be clamped into the drive 18; at the same time, the downward movement of the rocker plate release 159 causes the front edge of the rocker plate 156 to move away from the pressure roller 140. This permits the disk 14 to rotate freely while in the drive 18. When the clamp roller 158 is fully rotated to close the disk drive 18, the sensors A and B are both dark, just as in the pick position. However, the sensor has passed through the middle position, and midway between the middle and clamp positions the sensor A was light while the sensor B was dark. By knowing both the prior state and the current state, the position and direction of the drive mechanism can be determined. In addition, the sensor C has transitioned from dark to light, as discussed above. This combination permits the disk 14 to be processed by having software or other information duplicated thereon under the control of a personal computer or other suitable external controller (not shown), in a manner well known in the art. While the disk is being processed, the remainder of the loader is essentially quiescent. Upon completion of the processing of the disk, the external controller signals the internal controller of the autoloader that processing is finished. Referring now to FIG. 6, this causes the autoloader 10 to restart the cycle by rotating the motor 122 in the first direction and reversing the motor 142. The rotation of the motor 122, in addition to starting to drive the picker 120 forward, also quickly releases the clamp roller 158. The release of the clamp roller 158 and the rocker plate release 159 causes the disk 14 to be lightly clamped between the rocker plate 156 and the pressure roller 140, permits the now processed disk to be removed from the drive 18. Since the motor 142 is now rotating in the opposite direction, the pressure roller 140 grabs the disk 14 and backs it out of the drive 18. As before, the sensor C transitions from light to dark, and then back after the disk has passed by.

As the disk 14 passes between the pressure roller 140 and the rocker plate 156, the disk is forced under the leaf spring 154. The "H" shape of the leaf spring 154 may be better appreciated from FIG. 2a, where the spring 154 is shown in phantom. This prevents the disk 14 from moving back into the holding bin, or into the path of the next disk to be processed. At this point, the disk 14 is in a position substantially as shown in FIG. 6.

With continued reference to FIG. 6, after the disk has been processed, the disk is moved backward toward the rear of the autoloader, where it is fed either into an accept bin 162 or a reject bin 164. To reach the accept bin 162 or reject bin 164, the disk passes below the leaf spring 154 and above the rocker plate 156 until it reaches the second pressure roller 150. The pressure roller forces the disk to pass between the rear portion of the leaf spring 154 and the second pressure roller, and then toward a rear pressure plate 166 and third pressure roller 152. As the disk passes past the third pressure roller, it breaks the light of sensor D, again an LED-phototransistor pair. The internal controller thus knows the location of the disk 14. If the disk 14 was processed successfully, as determined by the external controller, the third pressure roller 152 drives the disk into the accept bin 162 by simply continuing the rotation of the pressure rollers in the same direction.

In the great majority of cases, the disk 14 will have been successfully processed in the drive 18, such that the disk will need to be stored in the accept bin 162. As noted previously, it is important to be able to remove processed disks from the autoloader without ceasing operation. To achieve this goal, and as best shown in FIG. 6, the third pressure roller deposits the disk 14 onto a stacker plate 168. Referring also to FIGS. 3a and 8a-d, the disk 14 is shown resting on the stacker plate 168 in FIG. 8a. As the picker 120 is moved forward by the rotation of the motor 122, the pivot arm 126 rotates in a clockwise direction (viewed from the right side as shown in FIG. 3a) and causes the lower roller 128b to contact a stacker pressure plate 170, driving it backward. The pressure plate 170 may be constructed of a flexible material such as low density polyethylene plate, such that it may be fixedly attached to a lower portion of the outside of the reject bin 164.

As the pressure plate 170 moves backward, it forces backward a stacker drive arm 172 to which it is rotatably connected. The drive arm 172 is connected to an L-shaped pivot arm 174, which pivots about a shaft 176. A pin 178 connects to the angle of the pivot arm 174, and connects to the back of the stack plate 168. The stack plate 168 pivots about the shaft 176, which extends across the width of the accept bin 162. When, as shown in FIG. 3a, the drive arm 172 is driven backward, it causes the pivot arm 174 to rotate and drive the back of the stack plate 168 downward. Since the pivot point of the stack plate 168 is slightly forward of the pin 178, the downward movement of the back of the stack plate 168 causes a proportionately greater rise of the front of the stack plate 168, as shown in FIG. 3a.

The movement of the disk 14 during the rise of the stack plate 168 is best understood from FIGS. 7a-d, and particularly 7b-c. From FIG. 7a, it can be appreciated that the stack plate starts its cycle below the stack of disks 14 resting on a pair of hinge plates 180a-b. As shown in in FIG. 7b, the stack plate 168 and the disk resting thereon rise toward the stack of disks 14 as the pivot arm 174 moves backward. When the disk 14 on the stack plate 168 passes the hinge plate 180a-b, the hinge plates are driven outward, allowing the disk 14 to pass upward into the bottom of the stack of disks.

Figure 7D:
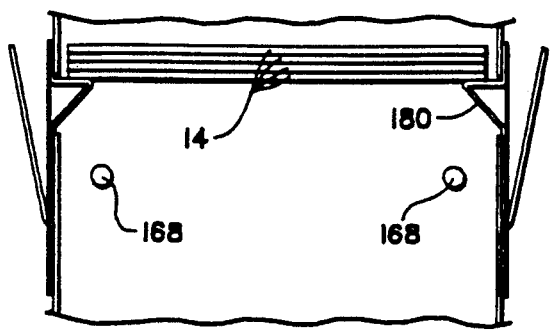
Figure 7C:
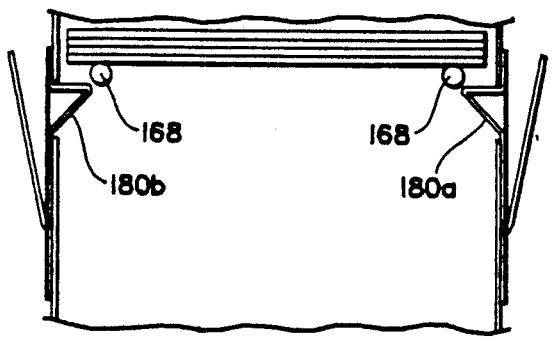
Figure 7B:
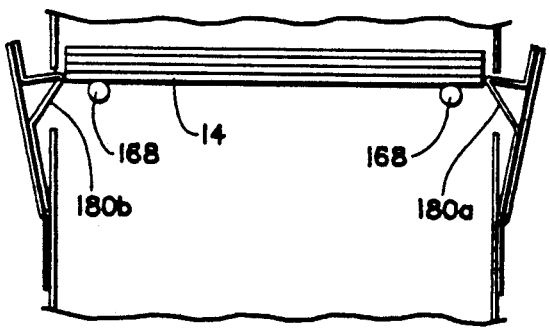
Figure 7A:
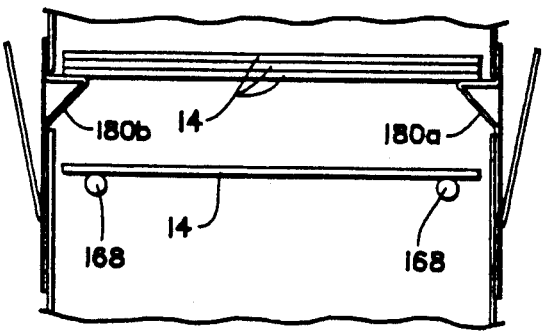

After the bottom disk moves upward past the hinge plates 180a-b, the plates spring inward and the stack plate can be lowered. As the stack plate is lowered, the disks come to rest on the hinge plates 180a-b, and the stack plate, unloaded, continues to move downward until it returns to the start position as shown in FIG. 7d. The processed disks may then be readily removed without stopping the processing of additional disks. To prevent excessive force on the stack plate 168 when it lifts the stack of processed disks 14, a slanted exit hopper 182 is provided as shown in FIG. 3a. The exit hopper 182 operates substantially the same as the inlet hopper 100, and is detachably connected from the accept bin 162 by means of positioning pins 184 and a retention plate 186.

However, if the disk was not successfully processed, the internal controller causes the disk to be deposited in a reject bin. Two reject modes are possible with the present invention. In the first reject mode, shown in FIG. 8a, the internal controller senses the state of the sensor D, causes the motor 142 1 to reverse direction and drives the disk 14 into the reject bin 164 between the rocker plate 154 and the rear pressure plate 166. The reject bin 164 may include a simple container, or may be any of the varieties known in the art for storing disks. In some instances, it may be desirable to leave the bottom of the reject bin 164 open, to permit disks deposited in the bin to be fed to a lower machine or other device.

In a second reject mode, shown in FIG. 8b, the rejected disk is deposited below the accept bin 162. In this mode, which also is triggered by the internal controller sensing the state of the sensor D, the motor 142 is reversed and, at a slow speed, moves the disk forward just until the sensor D becomes light. At this point the motor 142 is stopped, and the motor 122 is started to cause the drive arm to slightly lift the stack plate 168, so that the stack plate 168 is above the opening into the bin 162. The motor 122 is then stopped, and the motor 142 is started in reverse, causing the disk to be ejected into the opening in the bin 162 but below the stack plate. The rejected disk is thus deposited below the accept bin, where it may be readily accessed without stopping disk processing. It will be appreciated that, like the feed path, the exit path is also substantially straight line, although a change in direction may occur for one reject mode.

Referring now to FIG. 9, the general relationship between the sensors A-D, the internal and external controllers, the disk drive, and the reversing motors 122 and 142 can be appreciated. Depending on the present and prior state of the sensors A and B, the internal controller knows the position and direction of the drive mechanism controlling the picker 120, the clamp roller 158, and the stacker plate 168. Depending on the state of the sensors C and D, the internal controller knows the position of the disk 14 as it passes along the feed and exit paths. By combining the information from all of the sensors, it is straightforward for the internal controller to control the speed and direction of the motors 122 and 142, and also to communicate with the external controller which directs the operation of the disk drive 18. It will be appreciated by those skilled in the art that the internal controller may comprise any of a variety of microprocessors and related logic. Of course, the disk controller logic necessary for writing to and reading from the disk 18 may be considered either to be part of the external controller, or the disk.

It will be appreciated by those skilled in the art that the present invention may be practiced without inclusion of all of the features described hereinabove. More specifically, either the inlet hopper 100 or the exit stacking mechanism, with or without the exit hopper, or all three, may be removed. Likewise, the 1 inlet and outlet hoppers can be used in connection with other devices, just as the exit stacking mechanism with or without the exit hopper may be used on other devices.

Having fully described a preferred embodiment of the present invention, it will be appreciated by those skilled in the art, given the teachings herein, that numerous alternatives and equivalents exist which do not depart from the invention. As a result, the invention is not to be limited by the foregoing description but only by the appended claims.

I claim:

1. In a device for duplicating magnetic disks and the like comprising
    an inlet bin having a bottom and adapted to receive at least one magnetic disk, the inlet bin further having exit means for allowing a disk to exit the inlet bin,
    a first motor for driving a picker along a substantially straight path at the bottom of the inlet bin to cause a magnetic disk to be moved out of the inlet bin via the exit means,
    pressure roller means positioned substantially in a straight line path between the exit means and a disk processing device for receiving the disk as it exits from the inlet bin via the exit means, for positioning the disk in a disk processing device, and for extracting the disk from the disk processing device upon completion of processing, and
    leaf spring element positioned in the straight line path between the exit means of the inlet bin and the pressure roller means for altering the direction of the disk as it is extracted from the disk processing device, the leaf spring means deforming in a first direction to permit a disk to exit the inlet bin and pass over the leaf spring element to enter a disk processing device, but not deforming in said first direction when the disk is extracted from a disk processing device, thereby redirecting the disk.

2. The invention of claim 1 wherein the inlet bin comprises a rear wall, a front wall opposite the rear wall, a pair of side walls connected to the rear wall and the front wall, at least a portion of each sidewall being slanted relative to the front wall and the rear wall and extending substantially beyond the rear wall for supporting a plurality of disks, the distance between the front wall and the rear wall at the top thereof being at least as great as the diameter of the disk to be processed, and the distance between the front wall and the rear wall at a point lower than the top thereof being slightly less than the diameter of the disk to be processed.

3. The invention of claim 1 wherein the pressure roller means is driven by a second motor, and further including exit path means having an exit bin and comprising at least one additional pressure roller for directing a processed disk to the exit bin, wherein the exit path means is substantially a straight line.

4. The invention of claim 3 wherein the exit bin includes an accept bin and a reject bin, and includes selection means driven by the first motor for selectively causing a processed disk to be deposited in either the accept bin or the reject bin.

* * * * *